(12) United States Patent
Beall et al.

(10) Patent No.: US 9,772,788 B1
(45) Date of Patent: Sep. 26, 2017

(54) CABLE WITH INTEGRATED STATUS INDICATOR

(71) Applicant: Amazon Technologies, Inc., Seattle, WA (US)

(72) Inventors: Christopher Strickland Beall, Woodinville, WA (US); Roey Rivnay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/623,210

(22) Filed: Feb. 16, 2015

(51) Int. Cl.
*G06F 3/06* (2006.01)
(52) U.S. Cl.
CPC .......... *G06F 3/0634* (2013.01); *G06F 3/0604* (2013.01); *G06F 3/067* (2013.01)
(58) Field of Classification Search
None
See application file for complete search history.

(56) References Cited

U.S. PATENT DOCUMENTS

| 7,892,019 | B2 | 2/2011 | Rao et al. | |
| 2008/0003867 | A1* | 1/2008 | Wu | H01R 13/6658 439/490 |
| 2012/0113573 | A1* | 5/2012 | Ko | H01R 13/641 361/679.01 |
| 2013/0115803 | A1* | 5/2013 | Tang | H04Q 1/136 439/488 |

OTHER PUBLICATIONS

Amphenol, "Mini SAS Cable Assembly", Aug. 1, 2006, p. 1-7.*

* cited by examiner

*Primary Examiner* — Idriss N Alrobaye
*Assistant Examiner* — Dayton Lewis-Taylor
(74) *Attorney, Agent, or Firm* — Baker & Hostetler LLP

(57) ABSTRACT

An electrical connector includes a plurality of pins for transmitting electrical signals and at least one illumination device disposed on the electrical connector and electrically coupled to at least one of the pins. The illumination device is disposed so as to radiate light from the exterior of the electrical connector. The radiated light is visible while the electrical connector is engaged. The illumination device is configured to be controlled by pins that are not used for data transmission.

16 Claims, 6 Drawing Sheets ic service or to provide "software as a service" (e.g., cloud computing). The services provided by data centers are valuable to customers as the continued and reliable availability of the computing services are important to the customers' services and operations. It is thus necessary to provide reliable and efficient computing services in order to minimize disruptions to customers of the computing services, in particular when performing maintenance activities for data-storage devices.

CABLE WITH INTEGRATED STATUS INDICATOR

BACKGROUND

A data center is a facility that houses computer systems and various networking, storage, and other related components. Data centers may, for example, provide computing services to businesses and individuals as a remote computing service or to provide "software as a service" (e.g., cloud computing). The services provided by data centers are valuable to customers as the continued and reliable availability of the computing services are important to the customers' services and operations. It is thus necessary to provide reliable and efficient computing services in order to minimize disruptions to customers of the computing services, in particular when performing maintenance activities for data-storage devices.

BRIEF DESCRIPTION OF DRAWINGS

References are made to the accompanying drawings that form a part hereof, and that show, by way of illustration, specific embodiments or examples. The drawings herein are not drawn to scale. Like numerals represent like elements throughout the several figures. In the figures, reference numbers may be reused to indicate correspondence between referenced elements. The drawings are provided to illustrate example embodiments described herein and are not intended to limit the scope of the disclosure.

DETAILED DESCRIPTION

A data center may house many thousands of components, such as servers and disk storage devices that are typically housed in an equipment housing such as an equipment rack or an equipment chassis. An equipment housing may house multiple disk storage devices, and in the event of a failure or when the disk storage device must otherwise be replaced, a technician typically replaces the disk storage device by identifying the failed disk storage device by following cables to the failed device. In more complicated configurations with more disk storage devices, it can become increasingly difficult to properly identify the failed device. Issues can occur if the technician removes the wrong drive unexpectedly, such as the loss of data, extra cost due to the removal of a functional disk storage device, duplicate tickets for the same failed disk storage device, and so on.

In some embodiments, mechanisms for physical identification of failed devices may be implemented as the complexity and number of devices increases. Some complex systems may utilize backplanes to identify failed devices and thus prevent confusion as to the selection of a failed device. For example, LEDs may be provided on backplanes that illuminate to highlight and indicate the location of the failed device. In another example, control panels that indicate a failed device by identifying a row and column or general position of the failure may be provided. However the use of backplanes can add cost, block air flow, and impact signal integrity. It is therefore desirable in some cases to install computing devices such as server computers and storage devices such on racks without the use of backplanes.

Figure 1A:
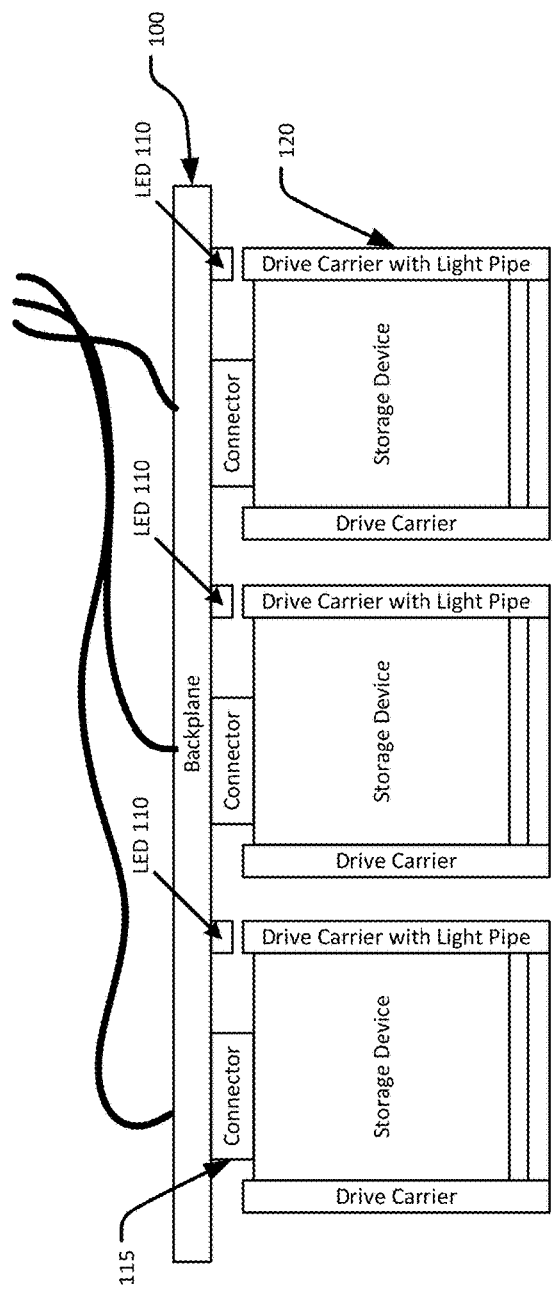
FIGS. 1A and 1B illustrate an array of storage devices and a top down view of an example where LEDs are installed on the backplane.
Figure 1B:
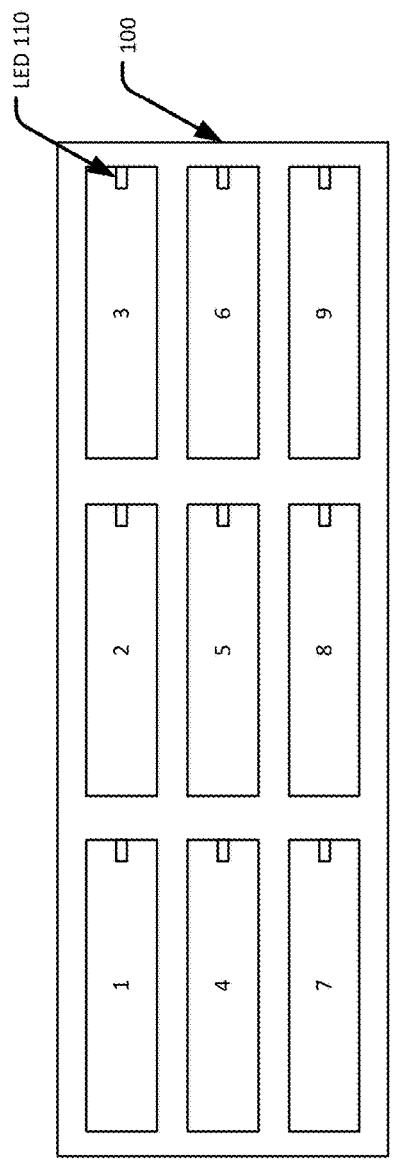
Figures 2A, 2B:
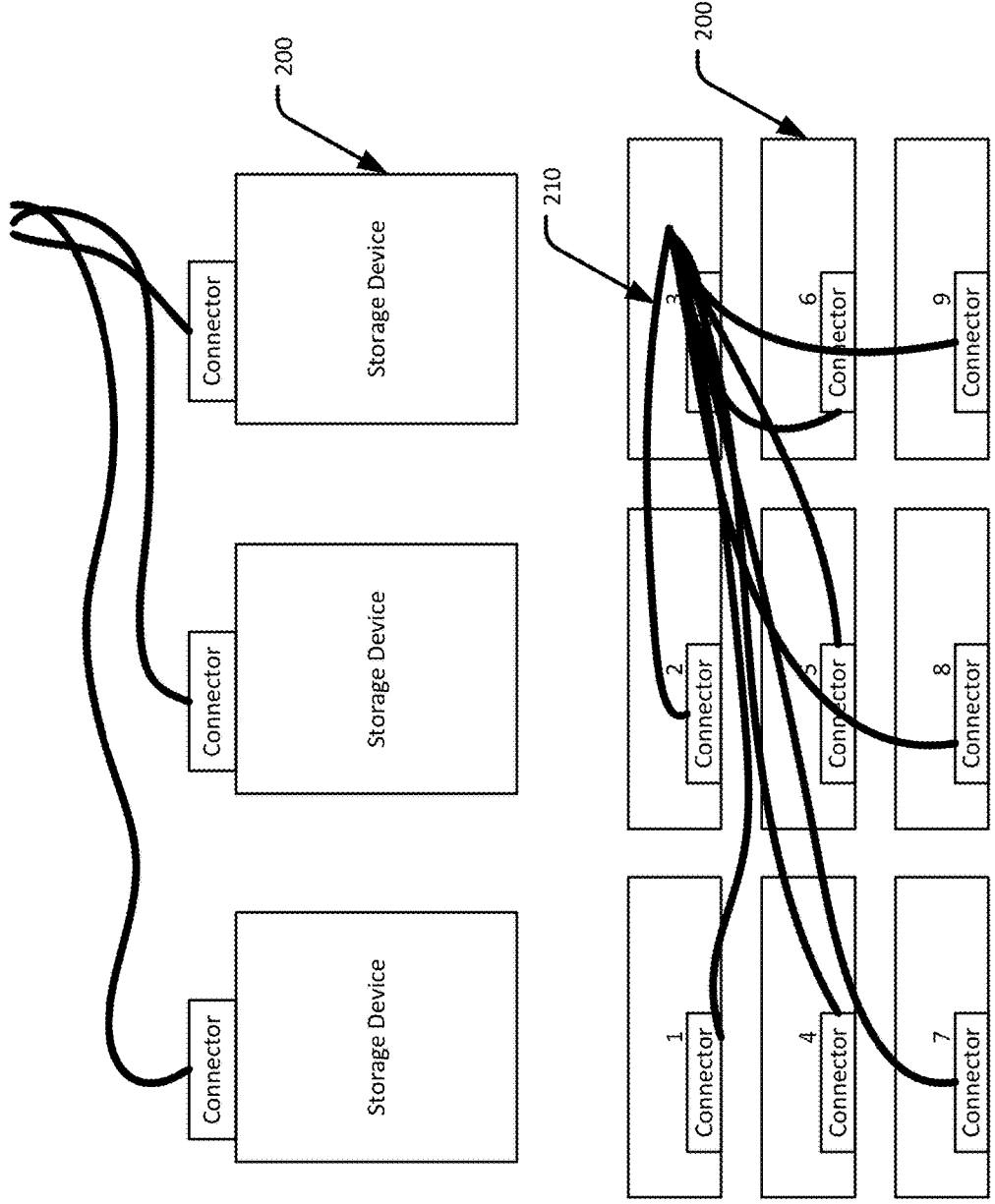
FIGS. 2A and 2B illustrate an array of storage devices and associated cables.

Referring to FIGS. 1A and 1B, illustrated are storage devices 120 (e.g., hard drives, solid-state drives (SSDs), or other storage devices) connected to backplane 100 via connectors 115. Indication of a failed storage device 120 may be indicated by one of the LEDs 110. In scenarios such as the one illustrated in FIGS. 2A and 2B where backplanes are not used, an array of storage devices 200 may be connected using cables 210. As shown, the cables 210 are routed to their associated storage devices 200 in an environment without a backplane. When a technician is tasked to remove a failed storage device, it can be seen that the technician may inadvertently select an incorrect storage device by simply trying to follow one of the cables. Furthermore, in many cases a failure in a storage device can result in a shutdown of the failed storage device so that first-mate/last-break functionality in the connection is not needed. Thus for instances where the technician must replace a storage device on a live system, burdening the system with the cost of complex blind mate hot plug mechanisms and backplanes may not be necessary, and the technician can pull cables and replace the drive.

The subject matter of the present disclosure is directed to using unused sideband signals in a cable such as an SATA or SAS cable to power an LED built directly into the cable connector. Storage devices are typically connected using Serial ATA (SATA). The LED can be molded into or inserted in the cable connector. In this way, a failed storage device can be identified by an illuminated LED on the connector being used by the failed storage device. By placing an LED on the actual cable connector associated with the failed storage device, the failed storage device can be quickly identified in cabled scenarios. In some embodiments, in the event that a technician must manually shut down the failed storage device, additional sideband signals may be used to enable a push button or a switch to turn the drive off. The button or switch can also be integrated into the cable connector. Sideband signals may refer to command, control, address, and other management signals that are not used for data transmission or delivery of data payloads.

Figure 3:
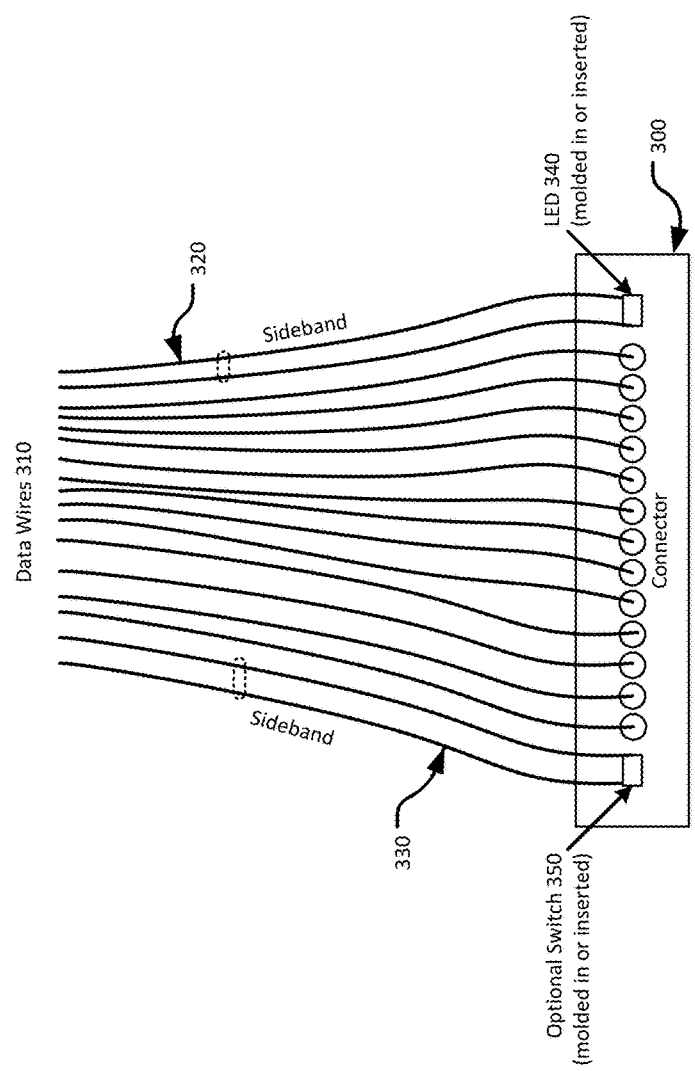
FIG. 3 is a diagram illustrating a cable with indicators in accordance with the present disclosure.

FIG. 3 illustrates an example embodiment of a cable with integrated status indicator in accordance with this disclosure. Illustrated is a connector 300 and a number of data wires 310 that are electrically connected to connector 300. In one embodiment, the connector 300 may include an LED 340 that may be molded in or inserted into the connector 300. The LED 340 may be connected to a pair of sideband wires 320 that are operable to drive the LED 340. Connector 300 may optionally include a switch 350 that may be molded or inserted into the connector 300. The optional switch 350 may be connected to a pair of sideband wires 330 that are operable to detect an electrical state of optional switch 350. The sideband wires 330 may be located in other parts of the wire bundle.

Although FIG. 3 illustrates an LED as an example of an integrated status indicator, other types of visible indications may be used that can allow a person to visually or otherwise determine which connector and thus which storage device should be replaced. For example, instead of a single LED installed on a part of the connector, the entire housing of the connector may be illuminated. Alternatively, the LED can be fitted with a lens to scatter light in multiple directions. Although storage devices are used in this example, the integrated status indicator may be added to a connector that is designed to be coupled to other types of devices or other line replaceable devices.

In some embodiments, the status indicator can be configured to provide multiple status indications. For example, the status indicator may flash or illuminate periodically or illuminate using a pattern to provide additional status indications.

In some embodiments, multiple status indicators may be added to a connector to indicate multiple states and functions. For example, a first status indicator may be used to indicate a faulty device, while a second status indicator may be used to indicate activity on the device. This can be used, for example, to indicate that the device is still powered on and active. The use of sideband or unused data wires can allow the status indicators to be added to existing cable wiring and pin configurations without having to design new cables and connectors. In one embodiment, two data wires can be used to drive each status indicator to provide a source and return.

The optional switch 350 shown in FIG. 3 may be configured as any type of switch that can indicate an electrical state such as a closed or open circuit. The mechanism can be a toggle-type switch or a momentary-type switch, for example. The switch may be used to power on or power off the connected device, or activate/deactivate other features depending on the specific application.

FIGS. 4A and 4B illustrate an example where LEDs 400 have been added to connectors 420 of storage devices 410. By locating the LEDs 400 directly on the connectors, a technician can quickly and easily locate which of the storage devices 410 are designated for removal or replacement. In a complex storage system without a backplane that maps the physical position of storage devices to an electrical position, the use of LEDs to illuminate and identify connectors can be useful in situations where, for example, service personnel have previously connected a storage device to the wrong cable. In this case, the physical mapping of the storage device and its corresponding cable may not match up with the electrical map. Subsequently, when a technician receives instructions to replace the drive in position X, the cable for position X is plugged into physical position B. Without any indication as to the actual storage device that should be replaced, the technician may turn off a live storage device and leave the failed storage device in the system. By having an indicator light on the connector itself, identification of which drive must be replaced is more clear and mis-wiring between cables and storage devices is minimized.

Figure 4:
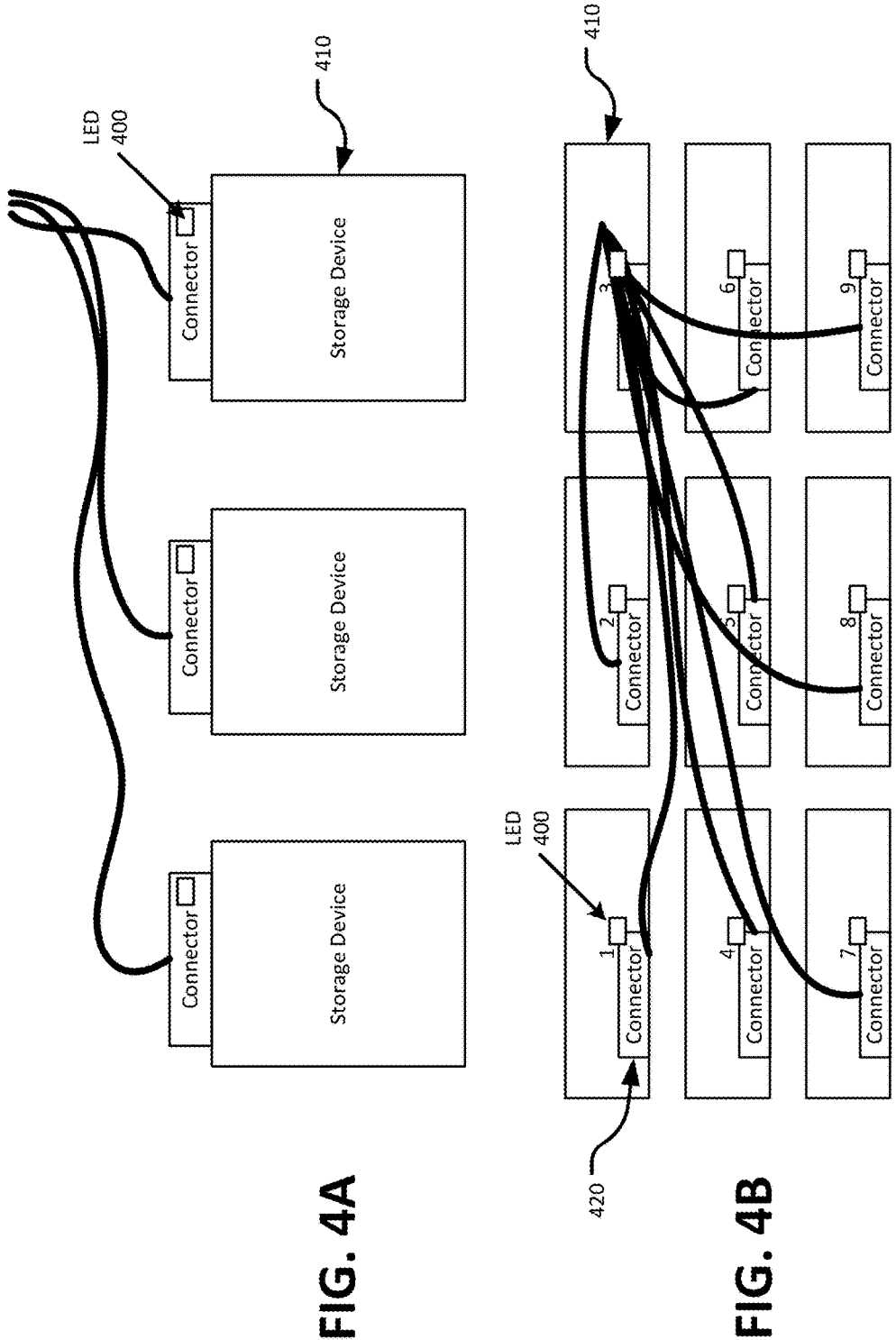
FIGS. 4A and 4B illustrate another perspective of a cable with indicators in accordance with the present disclosure.

As shown in FIG. 4, an integrated status indicator may be particularly useful when multiple devices are arranged in multiples columns and rows. A technician can visually determine which column or row contains an illuminated status indicator, whether from a top down view or a side view.

Figure 5:
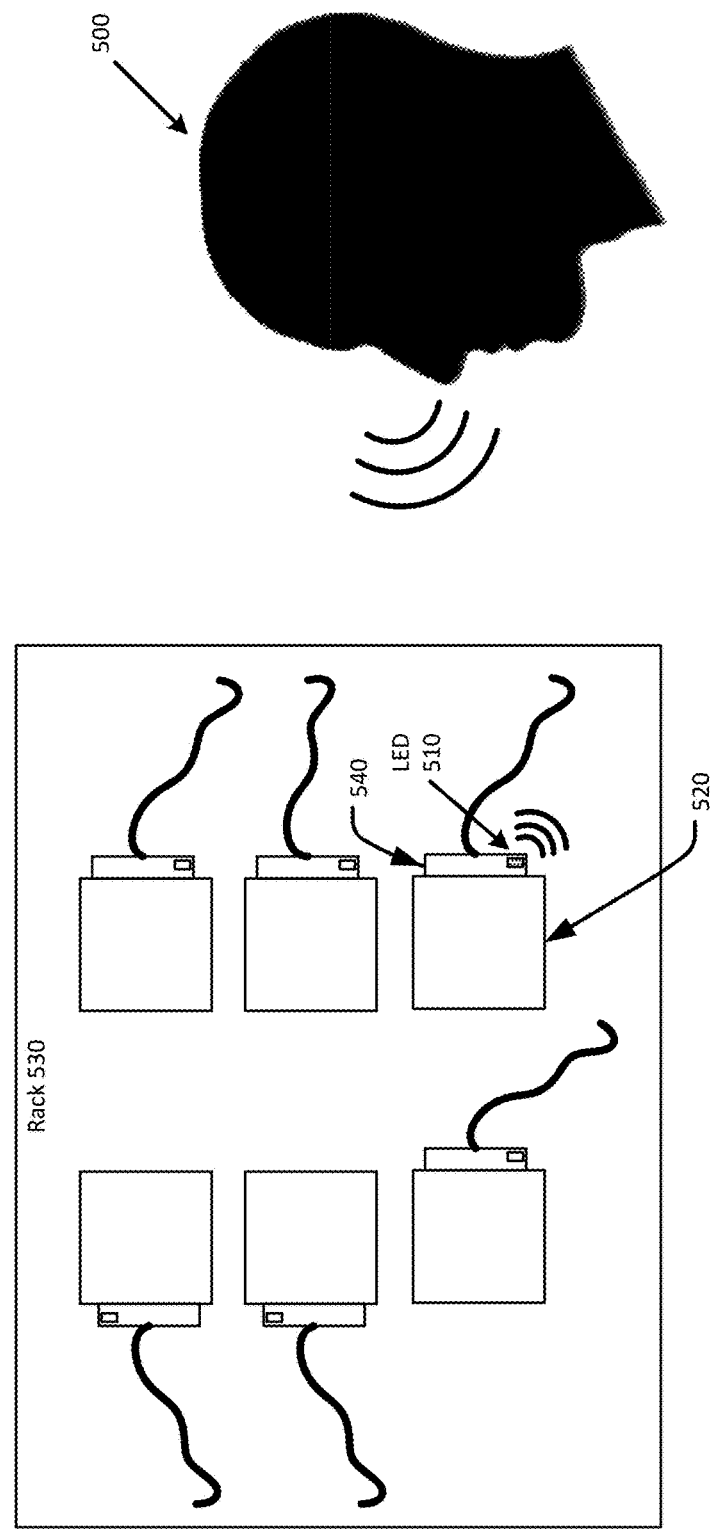
FIG. 5 is a diagram illustrating another perspective of an array of storage devices with an indicator in accordance with the present disclosure.

FIG. 5 shows an example perspective where an LED 510 has been added to connector 540 of storage device 520 that is installed in rack 530 (e.g., a server rack). By observing the LED 510 directly on the connectors, a technician 500 can quickly and easily locate storage device 520, even though the device 520 is still sitting in the rack 530. In some cases, the device 520 can be installed in a server chassis (not shown), in which case the LED 510 can likewise still be visible while the device 520 is mounted in the chassis. FIG. 5 shows that even in an arrangement where multiple devices are closely mounted in a horizontal plane in a relatively small area, such as the rack 530, the LEDs on the connectors of the devices are visible to the technician 500.

Figure 6:
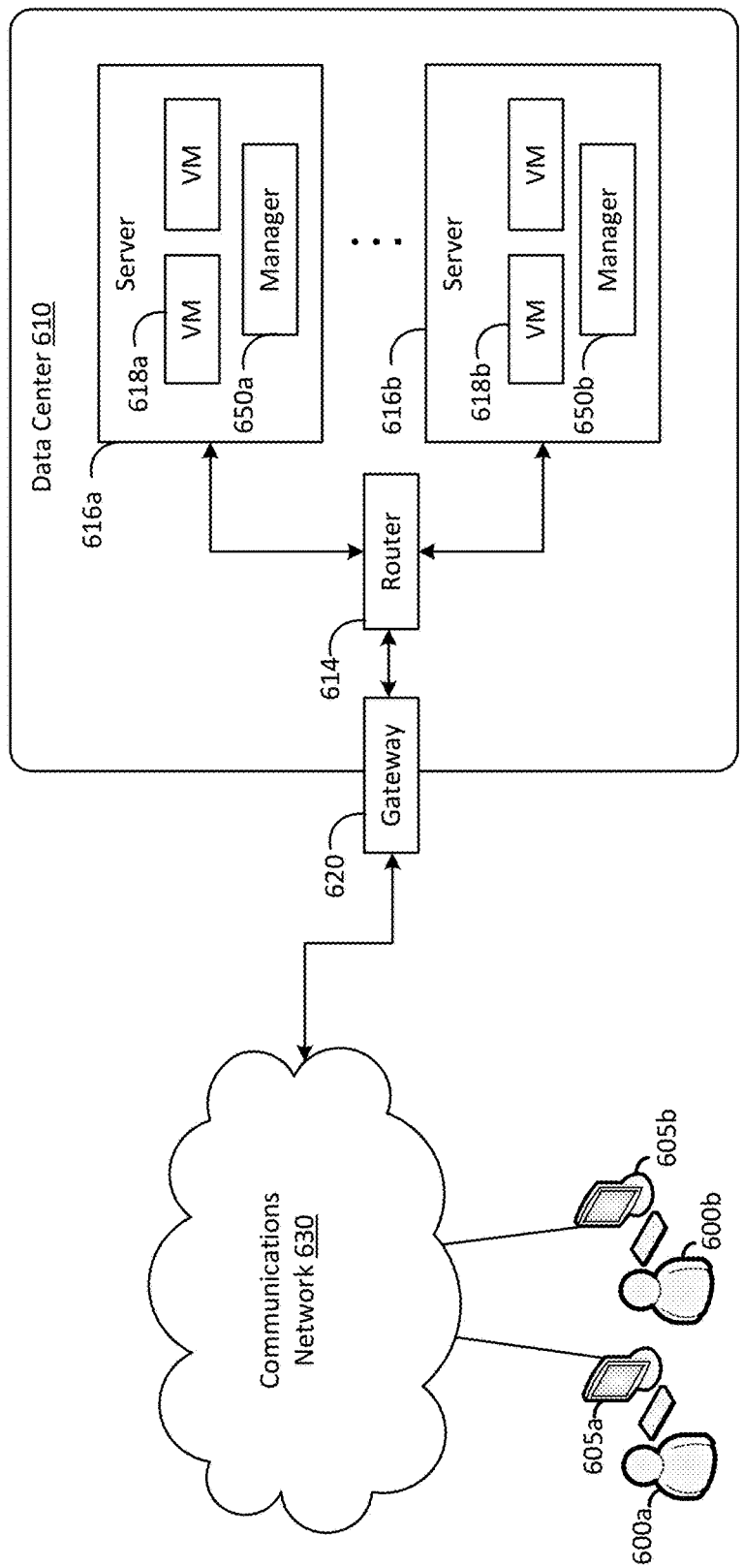
FIG. 6 is a diagram illustrating a computing environment where aspects of the present disclosure can be implemented.

FIG. 6 illustrates an example computing environment in which the embodiments described herein may be implemented. FIG. 6 is a diagram schematically illustrating an example of a data center 610 that can provide computing resources to users 600a and 600b (which may be referred herein singularly as "a user 600" or in the plural as "the users 600") via user computers 605a and 605b (which may be referred herein singularly as "a computer 605" or in the plural as "the computers 605") via a communications network 630. Data center 610 may be configured to provide computing resources for executing applications on a permanent or an as-needed basis. The computing resources provided by data center 610 may include various types of resources, such as data processing resources, data storage resources, data communication resources, and the like. Each type of computing resource may be general purpose or may be available in a number of specific configurations. For example, data processing resources may be available as virtual machine instances. The instances may be configured to execute applications, including Web servers, application servers, media servers, database servers, and the like. Data storage resources may include file storage devices, block storage devices and the like.

Data center 610 may include servers 618a and 618b (which may be referred herein singularly as "a server 618" or in the plural as "the servers 618") that provide computing resources available as virtual machine instances 616a and 616b (which may be referred herein singularly as "a virtual machine instance 616" or in the plural as "the virtual machine instances 616"). The virtual machine instances 616 may be configured to execute applications, including Web servers, application servers, media servers, database servers, and the like. Other resources that may be provided include data storage resources (not shown) and may include file storage devices, block storage devices, and the like.

Communications network 630 may, for example, be a publicly accessible network of linked networks and possibly operated by various distinct parties, such as the Internet. In other embodiments, communications network 630 may be a private network, such as, for example, a corporate or university network that is wholly or partially inaccessible to non-privileged users. In still other embodiments, communications network 630 may include one or more private networks with access to and/or from the Internet.

Communications network 630 may provide access to computers 602. Computers 602 may be computers utilized by customers 600 or other customers of data center 610. For instance, user computer 605a or 605b may be a server, a desktop or laptop personal computer, a tablet computer, a wireless telephone, a personal digital assistant (PDA), an e-book reader, a game console, a set-top box, or any other computing device capable of accessing data center 610. User computer 605a or 605b may connect directly to the Internet (e.g., via a cable modem or a Digital Subscriber Line (DSL)). Although only two user computers 605a and 605b are depicted, it should be appreciated that there may be multiple user computers.

Servers 616a and 616b (which may be referred herein singularly as "a server 616" or in the plural as "the servers 616") shown in FIG. 6 may be standard servers configured appropriately for providing the computing resources described above and may provide computing resources for executing one or more applications. In one embodiment, the computing resources may be virtual machine instances 618. In the example of virtual machine instances, each of the servers 616 may be configured to execute an instance manager 650a or 650b (which may be referred herein singularly as "an instance manager 650" or in the plural as "the instance managers 650") capable of executing the virtual machine instances. The instance managers 650 may be a virtual machine monitor (VMM) or another type of program configured to enable the execution of virtual machine instances 618 on servers 616, for example. As discussed above, each of the virtual machine instances 618 may be configured to execute all or a portion of an application.

In the example data center 610 shown in FIG. 6, a router 614 may be utilized to interconnect the servers 616a and 616b. Router 614 may also be connected to gateway 620, which is connected to communications network 630. Router 614 may manage communications within networks in data center 610, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

While the present disclosure describes examples in terms of networks and network equipment racks, it should be understood that the disclosed principles may be applied to other types of devices and environments where cable/connector identification is desired.

The above described aspects of the disclosure have been described with regard to certain examples and embodiments, which are intended to illustrate but not to limit the disclosure. It should be appreciated that the subject matter presented herein extends to and encompasses such modifications and/or enhancements that will be apparent to persons skilled in the art in view of the detailed description provided herein.

The various features described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

What is claimed is:

1. An apparatus for electrically coupling a storage device that is installed in an equipment housing, the apparatus comprising:
   a single SAS or SATA cable comprising a plurality of wires for transmitting electrical signals, the plurality of wires including a plurality of sideband wires and one or more data wires;
   a connector coupled to the plurality of wires;
   a switch disposed on the connector and electrically coupled to one or more first sideband wires of the plurality of sideband wires; and
   an illumination device disposed on the connector and electrically coupled to one or more second sideband wires of the plurality of sideband wires;
   wherein the illumination device is configured to be controlled by the one or more second side band wires electrically coupled to the illumination device, wherein the single SAS or SATA cable that comprises the plurality of wires including the plurality of sideband wires and the one or more data wires terminates at the connector on which the illumination device and the switch are disposed.

2. The apparatus of claim 1, wherein the apparatus is a SAS or SATA cable assembly.

3. The apparatus of claim 1, wherein the illumination device is an LED.

4. The apparatus of claim 1, wherein the storage device comprises a hard drive or a sold-state drive.

5. The apparatus of claim 1, wherein the illumination device is further disposed on the connector so as to illuminate an interior portion of the connector.

6. The apparatus of claim 1, wherein the illumination device is for indicating a failure of the storage device.

7. A method of replacing a computing or storage device, the method comprising:
   activating a switch disposed on a connector and electrically coupled to one or more first sideband wires of a plurality of sideband wires;
   toggling an illumination device disposed on the connector and electrically coupled to one or more second sideband wires of the plurality of sideband wires, wherein the illumination device is electrically coupled to a single SAS or SATA cable that terminates at the connector, wherein the single SAS or SATA cable comprises a plurality of wires including the plurality of sideband wires and one or more data wires, and wherein the connector is coupled to the computing or storage device;

disengaging the connector, wherein the connector is identified by the illumination device that is coupled to the computing or storage device; and replacing the computing or storage device that was disengaged from the identified connector.

8. The method of claim 7, wherein the computing or storage device is installed in a server rack.

9. The method of claim 7, wherein the illumination device is an LED.

10. The method of claim 7, wherein the illumination device comprises a light source embedded in a translucent housing for the connector.

11. The method of claim 7, wherein the illumination device is for indicating a failure of the computing or storage device.

12. An electrical connector comprising:
at least one switch disposed on the electrical connector and electrically coupled to one or more first sideband wires of a plurality of sideband wires; and
at least one illumination device disposed on the electrical connector and electrically coupled to one or more second sideband wires of the plurality of sideband wires;
wherein the at least one illumination device is configured to be controlled by the one or more second sideband wires, and wherein the plurality of sideband wires and one or more data wires are included in a plurality of wires comprised in a single SAS or SATA cable that terminates at the electrical connector on which the at least one switch and the at least one illumination device are disposed.

13. The electrical connector of claim 12, wherein a receptacle corresponding to the electrical connector is disposed in a server chassis or in a server rack.

14. The electrical connector of claim 12, wherein the at least one illumination device comprises a light source and a translucent housing for the electrical connector.

15. The electrical connector of claim 12, further comprising a second illumination device that is disposed so as to radiate light from an exterior of the electrical connector while the electrical connector is engaged with a corresponding receptacle, wherein the second illumination device is configured to be controlled by one or more signals received from a control source.

16. The electrical connector of claim 15, wherein the at least one illumination device is configured to generate at least two indications.

* * * * *